(12) United States Patent
Mehdizadeh

(10) Patent No.: US 7,538,561 B2
(45) Date of Patent: May 26, 2009

(54) METHOD FOR DETECTING AN INTERFACE BETWEEN FIRST AND SECOND STRATA OF MATERIALS

(75) Inventor: Mehrdad Mehdizadeh, Avondale, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 194 days.

(21) Appl. No.: 11/661,895

(22) PCT Filed: Sep. 2, 2005

(86) PCT No.: PCT/US2005/031863

§ 371 (c)(1),
(2), (4) Date: Mar. 1, 2007

(87) PCT Pub. No.: WO2006/031563

PCT Pub. Date: Mar. 23, 2006

(65) Prior Publication Data

US 2008/0106271 A1 May 8, 2008

Related U.S. Application Data

(60) Provisional application No. 60/609,152, filed on Sep. 10, 2004.

(51) Int. Cl.
G01R 27/04 (2006.01)
(52) U.S. Cl. .................. 324/637; 324/639; 324/644
(58) Field of Classification Search .................. 324/637, 324/639, 644
See application file for complete search history.

(56) References Cited

U.S. PATENT DOCUMENTS

| 2,836,739 | A | 5/1958 | Mesh |
| 3,710,244 | A | 1/1973 | Rauchwerger |
| 3,777,257 | A | 12/1973 | Geisselmann |
| 3,952,593 | A | 4/1976 | Ells |
| 3,974,695 | A | 8/1976 | Lerner |

(Continued)

FOREIGN PATENT DOCUMENTS

JP          6-347436          12/1994

(Continued)

OTHER PUBLICATIONS

U.S. Appl. No. 60/531,031, filed Dec. 18, 2003, Mehdizadeh.

(Continued)

*Primary Examiner*—Vincent Q Nguyen

(57) ABSTRACT

Methods of detecting an interface between materials having different dielectric loss factors using an apparatus having a transmission line including an inner conductor surrounded by dielectric and a shielding conductor are disclosed. Sublengths of inner conductor are exposed along the line, with adjacent sublengths being separated by shielded sublengths. In one embodiment the apparatus is excited by a signal and inserted into the materials to a predetermined depth. Signal attenuation is measured. The interface between strata is identified based upon signal attenuation. In another embodiment the apparatus is excited by a signal and progressively inserted into the materials. Apparatus position is tracked and t-he attenuation of the signal is monitored as a function of insertion distance to detect ranges having a substantial rate of change of attenuation and ranges having substantially no change of attenuation. The interface is identified based upon differences in the rate of change in attenuation.

2 Claims, 15 Drawing Sheets

U.S. PATENT DOCUMENTS

| | | |
|---|---|---|
| 4,209,740 A | 6/1980 | Marthe |
| 4,417,473 A | 11/1983 | Tward et al. |
| 4,540,936 A | 9/1985 | Walsh |
| 4,730,489 A | 3/1988 | Hoekstra |
| 4,837,499 A | 6/1989 | Sherer, III |
| 4,892,113 A | 1/1990 | Fattahi |
| 4,926,120 A | 5/1990 | Veronesi et al. |
| 4,941,501 A | 7/1990 | Birely |
| 4,952,868 A | 8/1990 | Sherer, III |
| 5,233,522 A * | 8/1993 | Sinclair ............... 702/7 |
| 5,400,651 A | 3/1995 | Welch |
| 5,424,649 A | 6/1995 | Gluck et al. |
| 5,479,104 A | 12/1995 | Campbell |
| 5,539,323 A | 7/1996 | Davis, Jr. |
| 5,542,788 A | 8/1996 | Stankus et al. |
| 5,550,478 A | 8/1996 | Kopera |
| 5,659,251 A | 8/1997 | Wakamatsu |
| 5,790,422 A | 8/1998 | Power et al. |
| 5,804,976 A | 9/1998 | Gaskin |
| 5,973,637 A | 10/1999 | Perdue et al. |
| 6,318,172 B1 | 11/2001 | Byatt et al. |
| 6,340,886 B1 | 1/2002 | Daughton et al. |
| 6,597,992 B2 | 7/2003 | Rooney et al. |
| 6,680,617 B2 | 1/2004 | Moreland et al. |
| 2003/0030449 A1 | 2/2003 | Moreland et al. |
| 2003/0072127 A1 | 4/2003 | Zias et al. |
| 2003/0083819 A1 | 5/2003 | Rooney et al. |
| 2003/0229449 A1 * | 12/2003 | Merchant et al. ............... 702/7 |
| 2005/0189947 A1 * | 9/2005 | Haugland ............... 324/338 |
| 2005/0264302 A1 | 12/2005 | Mohajer et al. |

FOREIGN PATENT DOCUMENTS

| | | |
|---|---|---|
| WO | WO 2005/060653 | 7/2005 |

OTHER PUBLICATIONS

U.S. Appl. No. 60/531,034, filed Dec. 18, 2003, Mehdizadeh.

PCT International Search Report and Written Opinion for International Application No. PCT/US05/31863 dated Feb. 9, 2007.

International Search Report dated Sep. 22, 2006—International Application No. PCT/US05/31864, International Filing Date: Sep. 2, 2005.

International Search Report dated Jan. 6, 2006—International Application No. PCT/US05/31865, International Filing Date: Sep. 2, 2005.

* cited by examiner

METHOD FOR DETECTING AN INTERFACE BETWEEN FIRST AND SECOND STRATA OF MATERIALS

CROSS-REFERENCE TO RELATED APPLICATION

This application claims priority under 35 U.S.C. §119 from U.S. Provisional Application Ser. No. 60/609,152, filed Sep. 10, 2004.

FIELD OF THE INVENTION

The present invention relates to a method for detecting an interface between a first and a second strata of materials.

DESCRIPTION OF RELATED ART

It is often necessary to determine the interface between two strata of materials, such as between two liquids in a vessel, which is typically required in a chemical separation or decanting operation. Conventional techniques using electromagnetic radiation, such as ultrasonic sensing or radio frequency ranging or optical/infrared sensing, are typically used in such applications. If the materials attenuate the transmitted radiation sufficiently, the upper strata of material may completely absorb the radiation and such techniques may be unable to detect the interface between an upper and a lower strata.

Accordingly, it is believed advantageous to provide a sensing apparatus, a system and a method for detecting the interface between two strata of materials, especially for materials that are highly absorbing, which overcomes the deficiency of the prior art.

SUMMARY OF THE INVENTION

The present invention is directed toward methods of detecting an interface between first and second materials having different dielectric loss factors disposed in a stratified manner in a volume of materials. The methods use a sensing apparatus having a length of transmission line that includes an inner conductor surrounded by a dielectric material and at least one shielding conductor. A predetermined number of sublengths of the inner conductor are exposed along the length of the transmission line, with adjacent sublengths of the exposed inner conductor being separated by shielded sublengths.

In a first embodiment of the method of the present invention the sensing apparatus is excited by a radio frequency signal at a predetermined amplitude.

The excited sensing apparatus is inserted into the volume of materials to a predetermined depth through the first layer and into the second layer. The signal transmitted through the sensing apparatus is detected and its attenuation measured. The interface between strata within the volume is identified based upon the attenuation of the radio frequency signal.

In an alternate embodiment the sensing apparatus is excited by a radio frequency signal at a predetermined amplitude and progressively inserted into the volume of materials. The position of the sensing apparatus within the volume is tracked and the attenuation of the radio frequency signal is monitored as a function of insertion distance into the volume to detect first distance ranges having a substantial rate of change of attenuation and second distance ranges having substantially no change of attenuation. The location of the interface between strata within the volume is identified based upon differences in the rate of change in attenuation in adjacent first distance ranges.

BRIEF DESCRIPTION OF THE FIGURES

The invention will be more fully understood from the following detailed description taken in connection with the accompanying drawings, which form a part of this application and in which.

DETAILED DESCRIPTION OF THE INVENTION

Figure 1:
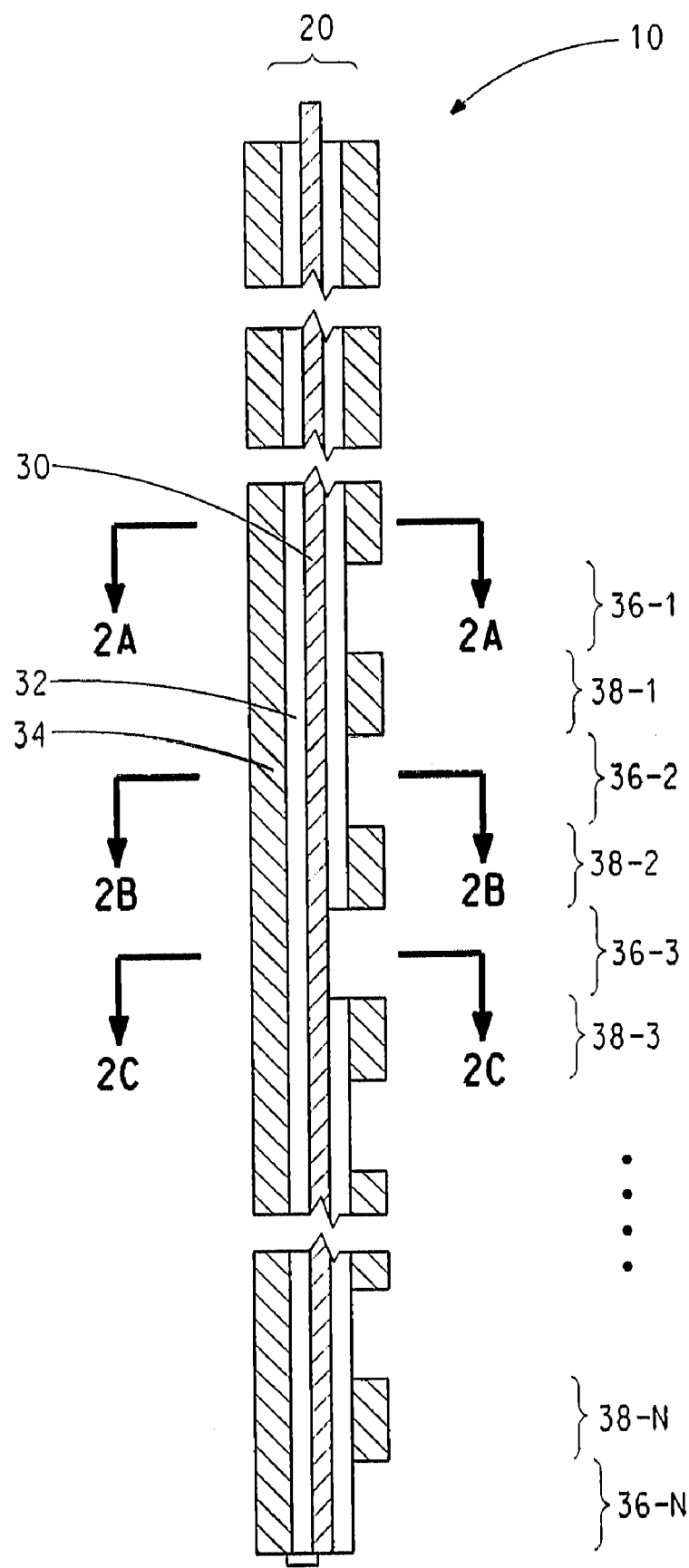
FIG. 1 is an elevational view in section of a sensing apparatus using a linear coaxial transmission line in accordance with the present invention.

Throughout the following detailed description similar reference characters refer to similar elements in all figures of the drawings.

The present invention is directed to a sensing apparatus 10 for detecting an interface defined between a first material $M_1$ and a second material $M_2$ disposed in a stratified manner in a volume of materials. The first material $M_1$ has a first dielectric loss factor and the second material $M_2$ has a second, different, dielectric loss factor. Either of the materials could be a liquid or a granular or pelletized solid. The sensing apparatus 10 comprises a length of transmission line 20 having an inner conductor 30 surrounded by a dielectric material 32 and at least one shielding conductor 34. A predetermined number of sublengths 36-1, 36-2, ..., 36-M of the inner conductor 30 are exposed along the length of the coaxial transmission line 20. Adjacent sublengths 36-1, 36-2, ..., 36-M of the exposed inner conductor 30 are separated by shielded sublengths 38-1, 38-2, ..., 38-N. The numbers M and N may be equal or may differ by no more than one. The term "exposed" is used throughout this application to convey the concept that the sublength of inner conductor can interact electromagnetically with the surrounding material.

Figure 3:
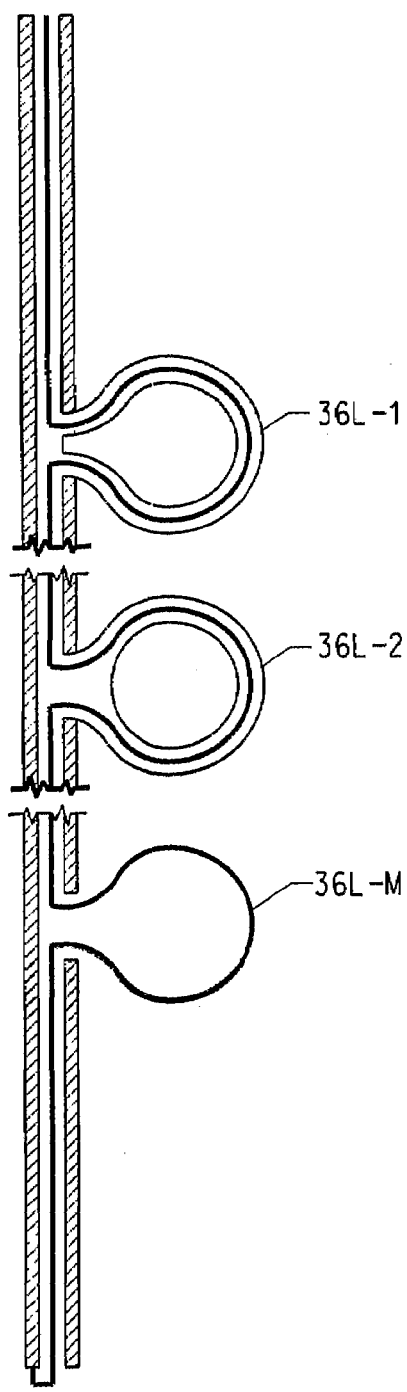
FIG. 3 is elevational view similar to FIG. 1 illustrating a generally linear transmission line in which the exposed sublengths of inner conductor are in the form of single-turn or multi-turn loops.
Figure 4:
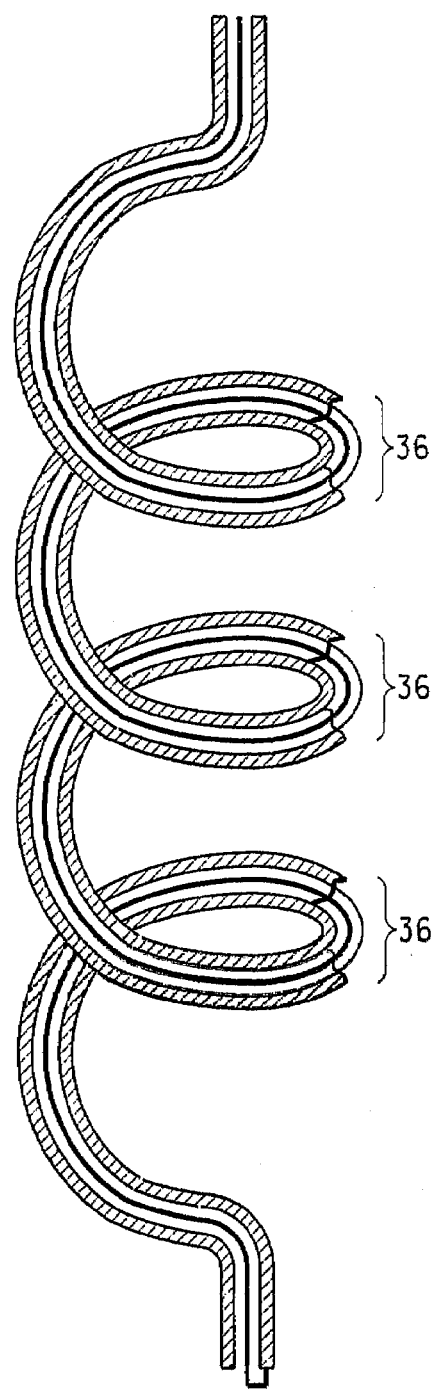
FIG. 4 is elevational view similar to FIG. 1 illustrating a helical transmission line.
Figure 5:
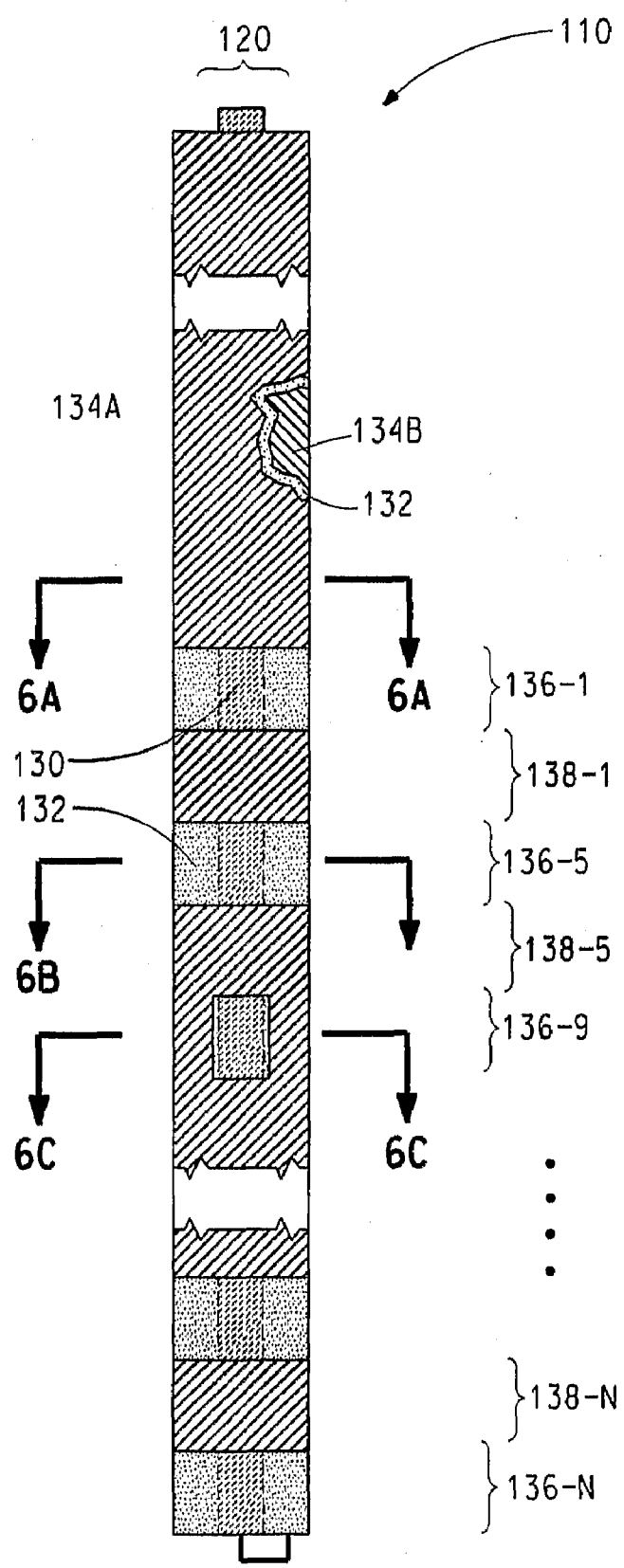
FIG. 5 is an elevational view in section of a sensing apparatus using a planar transmission line in accordance with the present invention.

In the embodiments of FIGS. 1 and 5 the transmission line 20 is substantially straight, while in FIG. 4 the transmission line 20 is helical. In FIGS. 1, 2A-2C, 3 and 4 the transmission line 20 is coaxial. In FIGS. 5 and 6A-6C the transmission line 20 is a planar (e.g., stripline) transmission line.

Figure 2A:
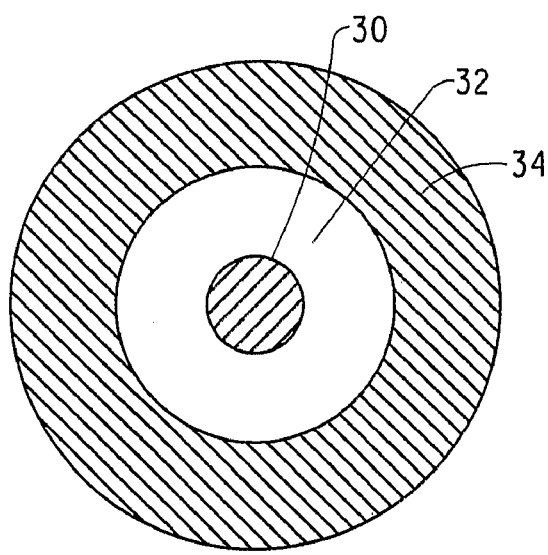
FIGS. 2A, 2B and 2C are sectional views taken along respective section lines 2A-2A, 2B-2B and 2C-2C in FIG. 1.
Figure 2B:
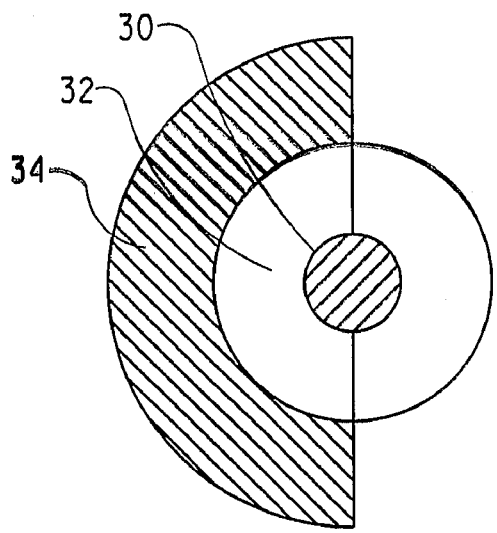
Figure 2C:
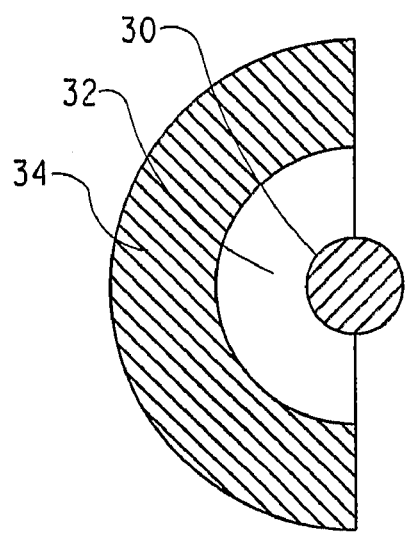

In the embodiment of FIGS. 1 and 2A-2C the sublengths 36 of exposed inner conductor 30 are collinear with the shielded sublengths 38. FIG. 2A illustrates a sectional view through a shielded sublength 38. FIGS. 2B and 2C show alternative arrangements wherein the exposed sublengths 36 are created by removing part of the shielding conductor 34 from the inner conductor 30. In FIG. 2B the inner conductor 30 remains mechanically surrounded by the dielectric material 32, while in FIG. 2C a portion of the dielectric material 32 has been removed to mechanically reveal the inner conductor 30. In both instances the inner conductor 30 is exposed electromagnetically.

As shown by reference characters 36L-1 and 36L-2 in FIG. 3 the exposed sublengths 36 may be looped in form. The loop 36L-1 is a single turn loop while the loop 36L-2 is a multi-turn loop. The sensitivity of the exposed loops to the dielectric loss factor of the material into which the sensing apparatus is inserted increases with the number of turns of the loop.

The transmission line 20 may be formed into a helix as shown in FIG. 4. The helical embodiment has the advantage of exposing more sublengths 36 of inner conductor 30 to the materials $M_1$ or $M_2$ for a given depth of insertion of the sensing apparatus.

FIGS. 5 and 6 show a planar form transmission line 120 in accordance with the present invention. The planar transmission line 120 has an inner conductor 130 surrounded by a dielectric material 132. The dielectric material 132 is sandwiched between a first shielding conductor layer 134A and a second shielding conductor layer 134B. A predetermined number of sublengths 136-1, 136-2, ..., 136-M of the inner conductor 130 are exposed along the length of the planar transmission line 120. Adjacent sublengths 136-1, 136-2, ..., 136-M of the exposed inner conductor 130 are separated by shielded sublengths 138-1, 138-2, ..., 138-N. Again, the numbers M and N may be equal or may differ by no more than one.

In the embodiment of FIGS. 5 and 6A-6C the sublengths 136 of exposed inner conductor 130 are collinear with the shielded sublengths 138. The exposed sublengths 136 may be created by removing all (FIG. 6B) or part (FIG. 6C) of the shielding conductor 134A from the inner conductor 130. In addition, that part of the second shielding conductor 134B indicated by the reference character 134R (in FIGS. 6B, 6C) may also be removed.

Figure 6A:
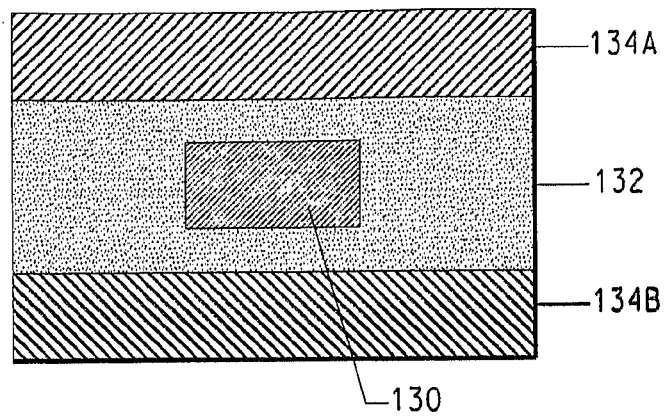
FIGS. 6A, 6B and 6C are sectional views taken respective section lines 6A-6A, 6B-6B and 6C-6C in FIG. 5.
Figure 6B:
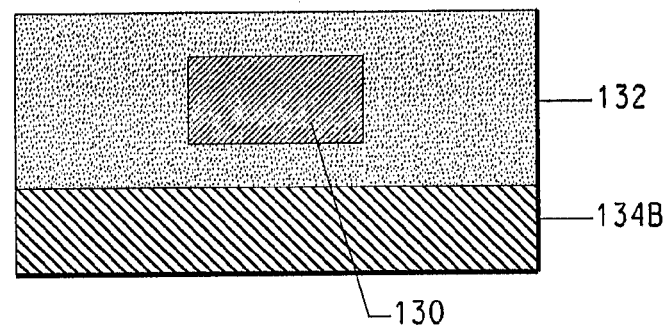
Figure 6C:
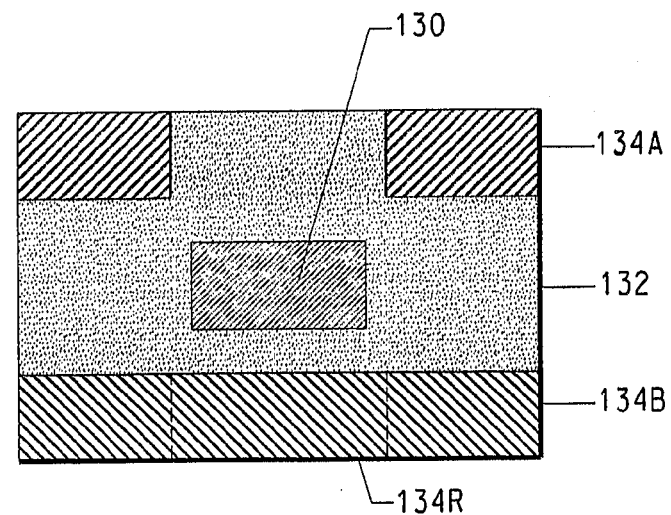

In FIGS. 6B and 6C the inner conductor 130 remains mechanically surrounded by the dielectric material 132, although it should be understood that a portion of dielectric material 132 may been removed to mechanically reveal the inner conductor 130.

It should be understood that a planar transmission line 130 may be implemented in a looped structure equivalent to that of FIG. 3 or a helical structure equivalent to that of FIG. 4.

-o-O-o-

Figure 7:
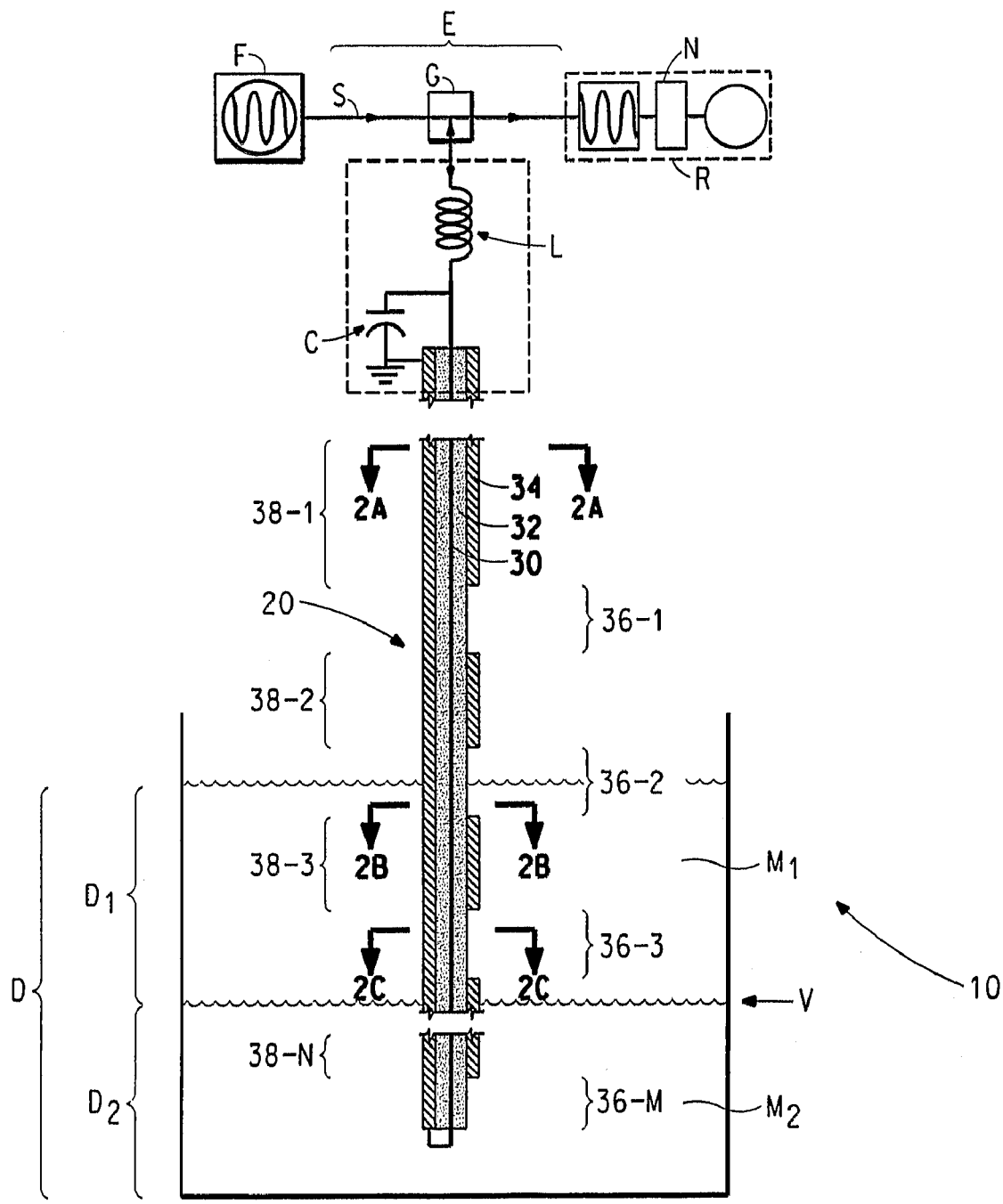
FIG. 7 is a schematic view of a sensing apparatus as shown in FIG. 1 or 5 in use in accordance with a first embodiment of a method of the present invention to detect an interface between first and second materials $M_1$, $M_2$ respectively, disposed in a stratified manner in a volume of materials, where the sensing apparatus is inserted to a predetermined depth into the volume.

As shown in FIG. 7, in accordance with a first embodiment of a method of the present invention, sensing apparatus 10/110 (FIG. 1, 3, 4, or 5) is excited by a radio frequency signal S at a predetermined amplitude and is inserted a predetermined total distance D into the volume V. (For economy of illustration the sensing apparatus of only FIG. 1 is illustrated). The distance D must be at least sufficient to pass through the interface between the materials $M_1$, $M_2$. As shown the distance D may conveniently be selected to be substantially equal, but just less than, the depth of the volume V. As shown, the sensing apparatus 10/110 is disposed a distance $D_1$ into material $M_1$ and a distance $D_2$ into material $M_2$. For purposes of illustration FIG. 7 shows the lengths of the exposed sublengths 36/136 and the shielded sublengths 38/138 are shown as being equal. However, it should be understood that the lengths of exposed sublengths 36/136 and shielded sublengths 38/138 may be selected to be either equal or different in accordance with the expected dielectric loss of the materials $M_1$, $M_2$, the overall depth of the volume of materials $M_1$, $M_2$, and the desired precision for determining the location of the interface. In a typical arrangement the number of the exposed sublengths 36/136 and the number of the shielded sublengths 38/138 may range from about two to about twenty.

A signal S from a radio frequency source F propagates down the sensing apparatus 10/110 into the volume V. The signal S is attenuated at each exposed sublength 36/136 in accordance with the dielectric loss factor $L_1$ and dielectric loss factor $L_2$ of the respective materials $M_1$, $M_2$ into which the particular exposed sublength 36/136 is disposed.

Each exposed sublength 36/136 is separated by shielded sublengths 38/138. Since the inner conductor 30/130 is not exposed to the materials $M_1$ or $M_2$ in the shielded sublengths 38/138, there is substantially no loss as the signal S passes through these shielded sublengths.

Figure 8:
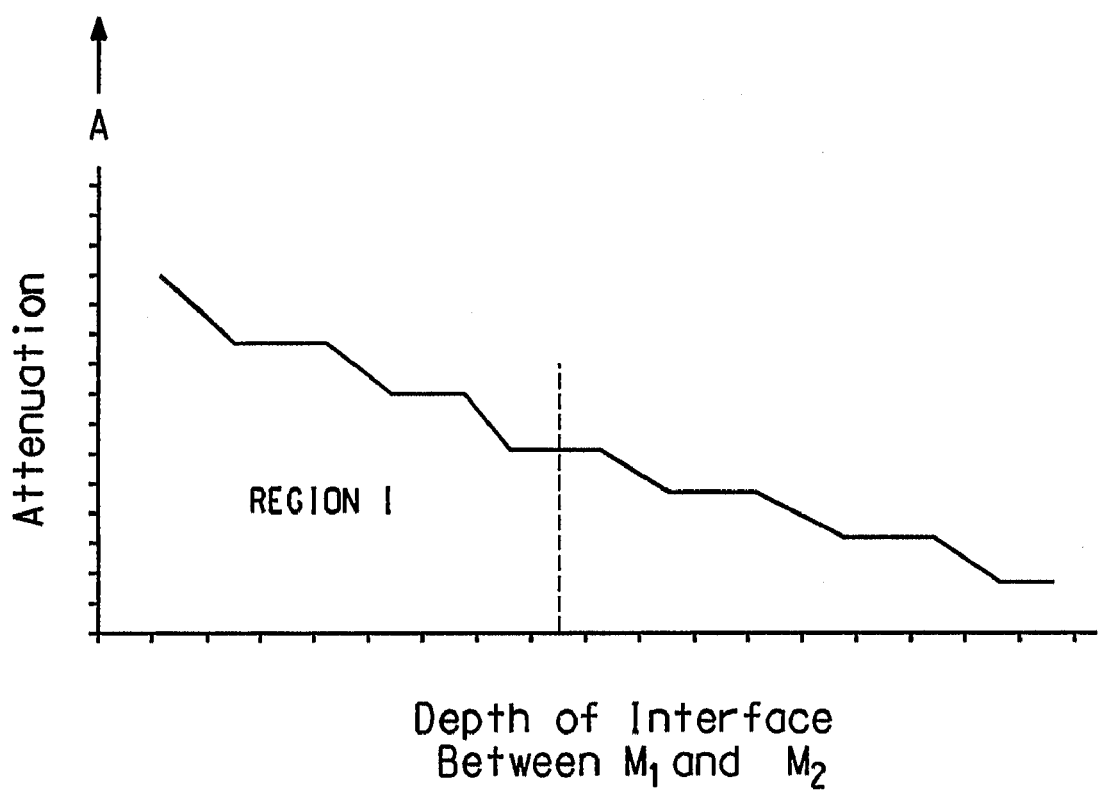
FIG. 8 is a plot showing the attenuation of a radio frequency signal passing though the sensing apparatus as a function of the position of the interface between the first and second materials.

FIG. 8 is a plot showing the attenuation A of a radio frequency signal S passing though the sensing apparatus 10/110 as a function of the position of the interface (i.e., the distance of the interface from the top of the volume) between the first and second materials $M_1$, $M_2$. The total attenuation A in amplitude of the radio frequency signal S is the sum of the attenuation in the first material $M_1$ plus the attenuation in the second material $M_2$. The attenuation in the first material $M_1$ is proportional to the total number of exposed sublengths 36/136, i.e., the number of lengths of the inner conductor 30/130, exposed to the first material $M_1$. The attenuation in the second material $M_2$ is proportional to the total number of exposed sublengths 36/136, i.e., the number of lengths of the inner conductor 30/130, exposed to the second material $M_2$. The attenuation A thereby provides an indication as to the location of the interface between the first material $M_1$ and the second material $M_2$.

As may be determined from inspection of FIG. 8, the loss factor $L_2$ of the second material $M_2$ is greater than the loss factor $L_1$ of the first material $M_1$ as evidenced by the greater change in attenuation per exposed sublength at the left of the plot (Region I). The sloped portions of the plot represent distance ranges where the position of the interface is adjacent to an exposed sublength 36/136. The level portions of the plot represent distance ranges where the position of the interface is adjacent to a shielded sublength 38/138. As is described in conjunction with FIG. 7 the lengths of exposed sublengths 36/136 are equal to the lengths of the shielded sublengths 38/138, as evidenced by the equal distance ranges along the x-axis of the sloped and level portions of the plot.

-o-O-o-

Figure 9A:
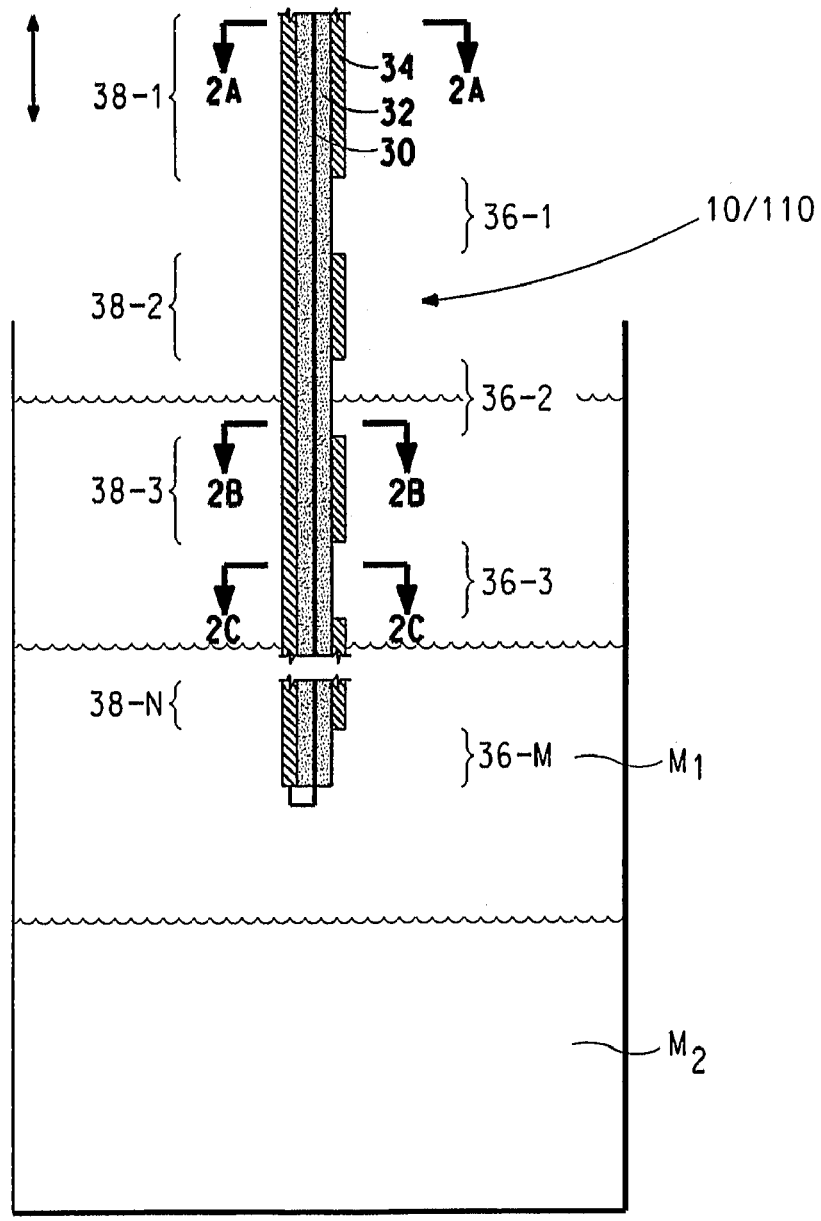
FIGS. 9A and 9B are schematic views of a sensing apparatus as shown in FIG. 1 or 5 in use in accordance with a second embodiment of a method of the present invention to detect an interface between first and second materials $M_1$, $M_2$ respectively, disposed in a stratified manner in a volume of materials, where the sensing apparatus is inserted progressively into the volume.
Figure 9B:
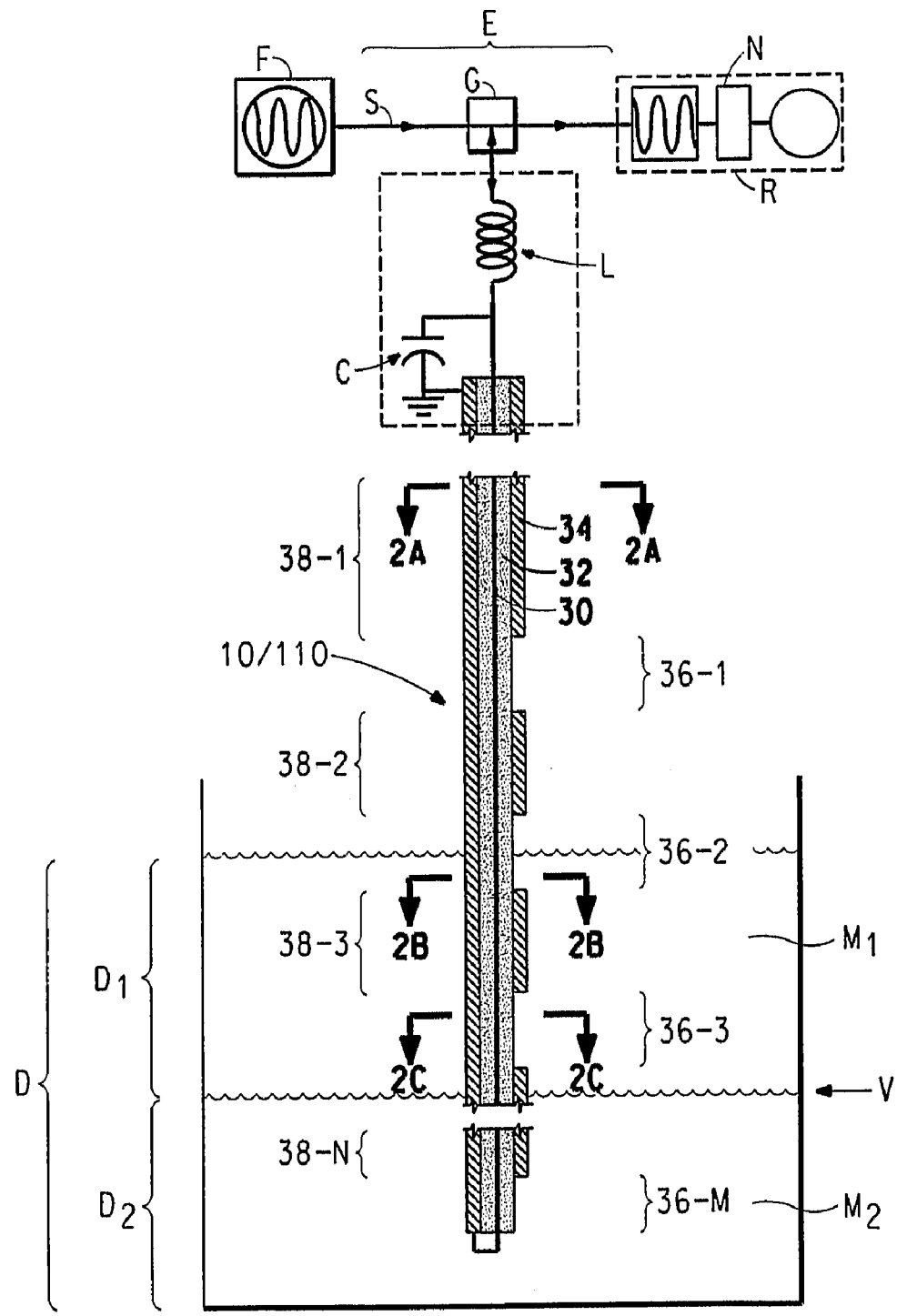

As shown in FIGS. 9A and 9B, in accordance with a second embodiment of a method of the present invention, the sensing apparatus 10/110 (FIGS. 1/5) is excited by a radio frequency signal S from a radio frequency source at a predetermined amplitude. The sensing apparatus 10/110 is inserted progressively into the volume V, as is apparent from a comparison of the insertion distances in FIGS. 9A and 9B. The signal S propagates down the sensing apparatus 10/110 into the volume V. The signal S is attenuated at each exposed sublength 36/136 in accordance with the dielectric loss factor $L_1$ and dielectric loss factor $L_2$ of the respective material $M_1$ or $M_2$ in which each particular exposed sublength 36/136 is disposed.

Each exposed sublength 36/136 is separated by shielded sublengths 38/138. Since the inner conductor 30/130 of the shielded sublengths 38/138 is not exposed to the material $M_1$ or $M_2$, there is substantially no loss as the signal S passes through these sublengths.

Figure 10:
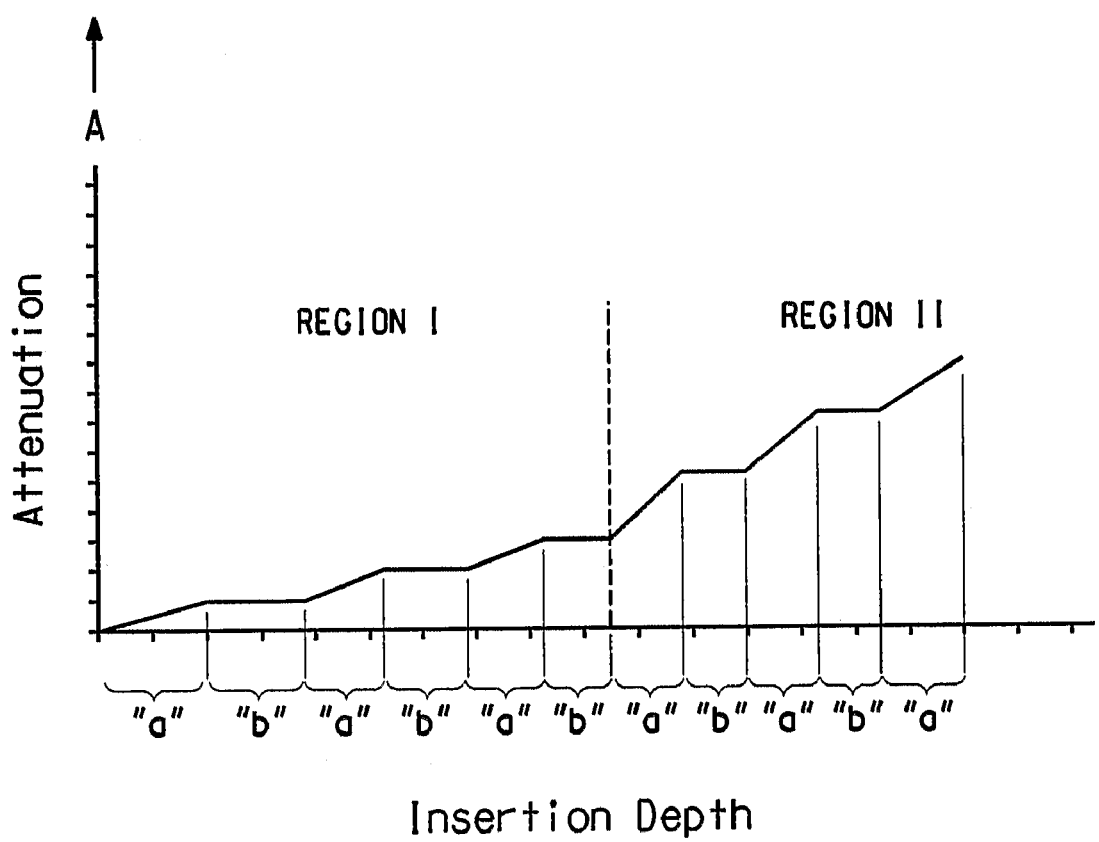
FIG. 10 is a plot showing the attenuation of a radio frequency signal passing though the sensing apparatus as a function of insertion distance.

As seen from FIG. 9A, as the length of sensing apparatus 10/110 is progressively inserted into the material $M_1$, the attenuation A in amplitude of the radio frequency signal S is proportional to the number of exposed sublengths 36/136 (i.e., the total length of the inner conductor 30/130) exposed to the dielectric loss created by the first material $M_1$ (Region I of the plot of FIG. 10).

As seen from FIG. 9B, as the length of transmission line 20/120 is progressively inserted through the material $M_1$ into the material $M_2$, the attenuation A in amplitude of the radio frequency signal S further increases in proportion to the additional number of exposed sublengths 36/136 (i.e., the total length of the inner conductor 30/130) exposed to the dielectric losses created by the second material $M_2$ (Region II of the plot of FIG. 10.)

FIG. 10 shows a plot of attenuation along the Y-axis relative to the insertion depth of the sensing apparatus along the X-axis. Region I represents the sensing apparatus 10/110 being inserted into a first material $M_1$, while Region II represents the sensing apparatus 10/110 being inserted in a second material $M_2$. It can be seen that the attenuation increases as the insertion depth increases.

As the first exposed sublength 36/136 is inserted into the first material $M_1$ a first distance range "a" is defined in which the attenuation increases at a substantial rate. The slope of the plot in the first distance range "a" is indicative of the loss factor $L_1$ of the first material $M_1$. The length of the first distance range "a" along the x-axis equals the length of the first exposed sublength 36/136.

As the sensing apparatus is further inserted the first shielded sublength 38/138 is introduced into the first material $M_1$. This occurrence defines a second distance range "b" in which the attenuation has substantially no change. The length of the second distance range "b" along the X-axis equals the length of the shielded sublength 38/138.

As each additional exposed sublength 36/136 is inserted into the material $M_1$ additional first distance ranges "a" are defined (in which the attenuation increases at a substantial rate). Similarly, as each additional shielded sublength 38/138 enters the material $M_1$ additional second distance ranges "b" (in which the attenuation has substantially no change) are defined.

As illustrated in Region II, as the first exposed sublength 36/136 enters the second material $M_2$ another first distance range "a" (in which the attenuation increases at a substantial rate) is defined. Note, however, that owing to the difference in dielectric loss factor $L_2$ in material $M_2$ the rate of change of attenuation in this first distance range "a" in the material $M_2$ is different from the rate of change of attenuation in first distance ranges "a" in the first material $M_1$.

As the first shielded sublength 38/138 enters the second material $M_2$ another second distance range "b" is defined in which the attenuation has substantially no change.

As seen from FIG. 10 an interface between the first material $M_1$ and the second material $M_2$ may be detected by comparing the rates of change of attenuation in adjacent first distance ranges "a" and identifying that position along the depth axis at which the rates of change are different.

Note that the loss factor $L_2$ of the second material $M_2$ is illustrated to be greater than the loss factor $L_1$ of the first material $M_1$. It should be appreciated that the reverse could be true.

Note also, that for purposes of illustration the lengths of the exposed sublengths 36/136 and the shielded sublengths 38/138 as being equal. As was discussed in conjunction with FIG. 7, it should be understood that the lengths of exposed sublengths 36/136 and shielded sublengths 38/138 may be selected to be either equal or different in accordance with the expected dielectric loss of the materials $M_1$, $M_2$, the overall depth of the volume of materials $M_1$, $M_2$, and the desired precision for determining the location of the interface.

-o-O-o-

Figure 11A:
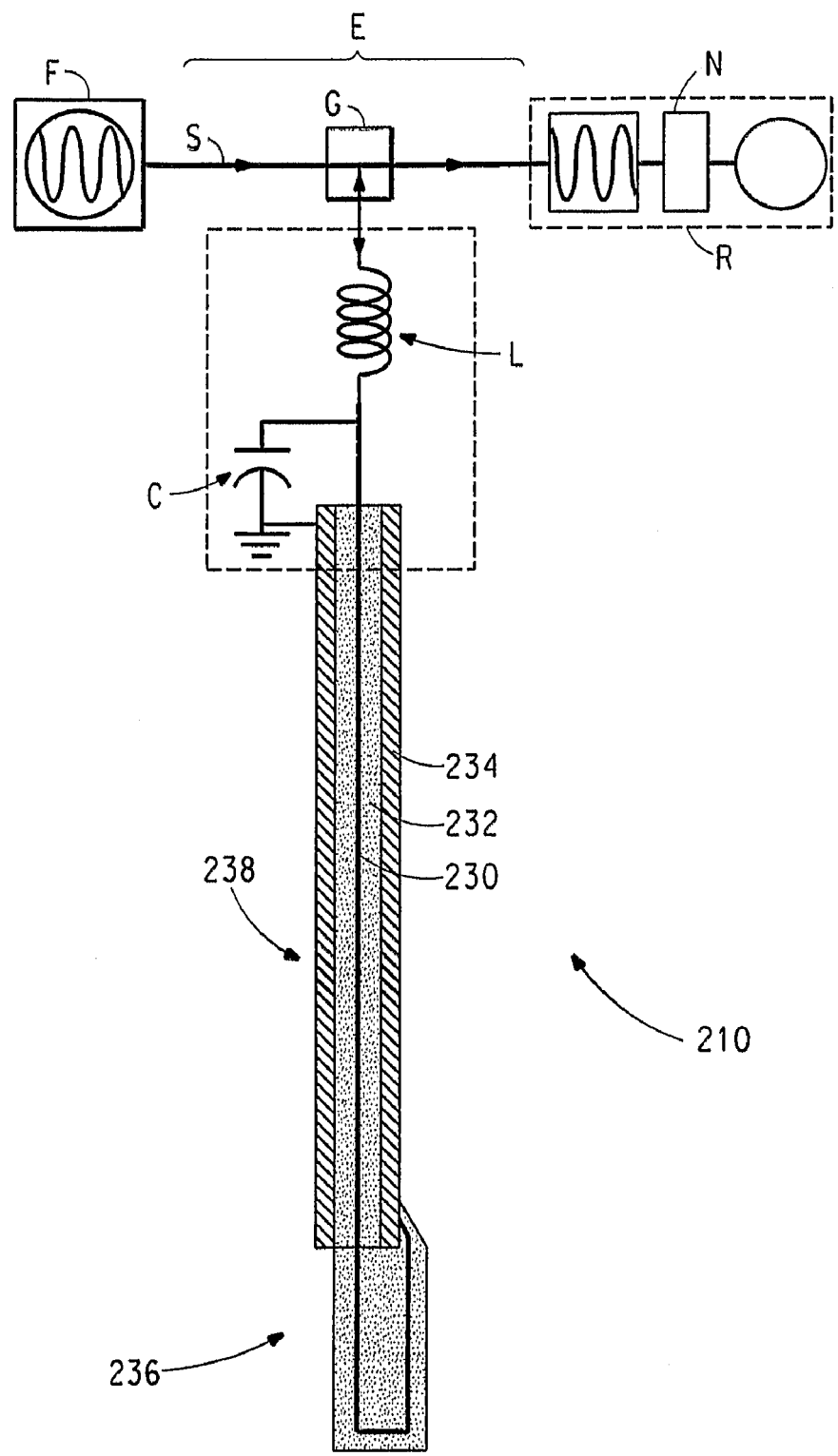
FIGS. 11A and 11B are diagrammatic views of alternate forms of a modified sensing apparatus amenable in use in accordance with the second (progressive insertion) embodiment of a method of the present invention, each sensing apparatus having a single exposed sublength of transmission line.
Figure 11B:
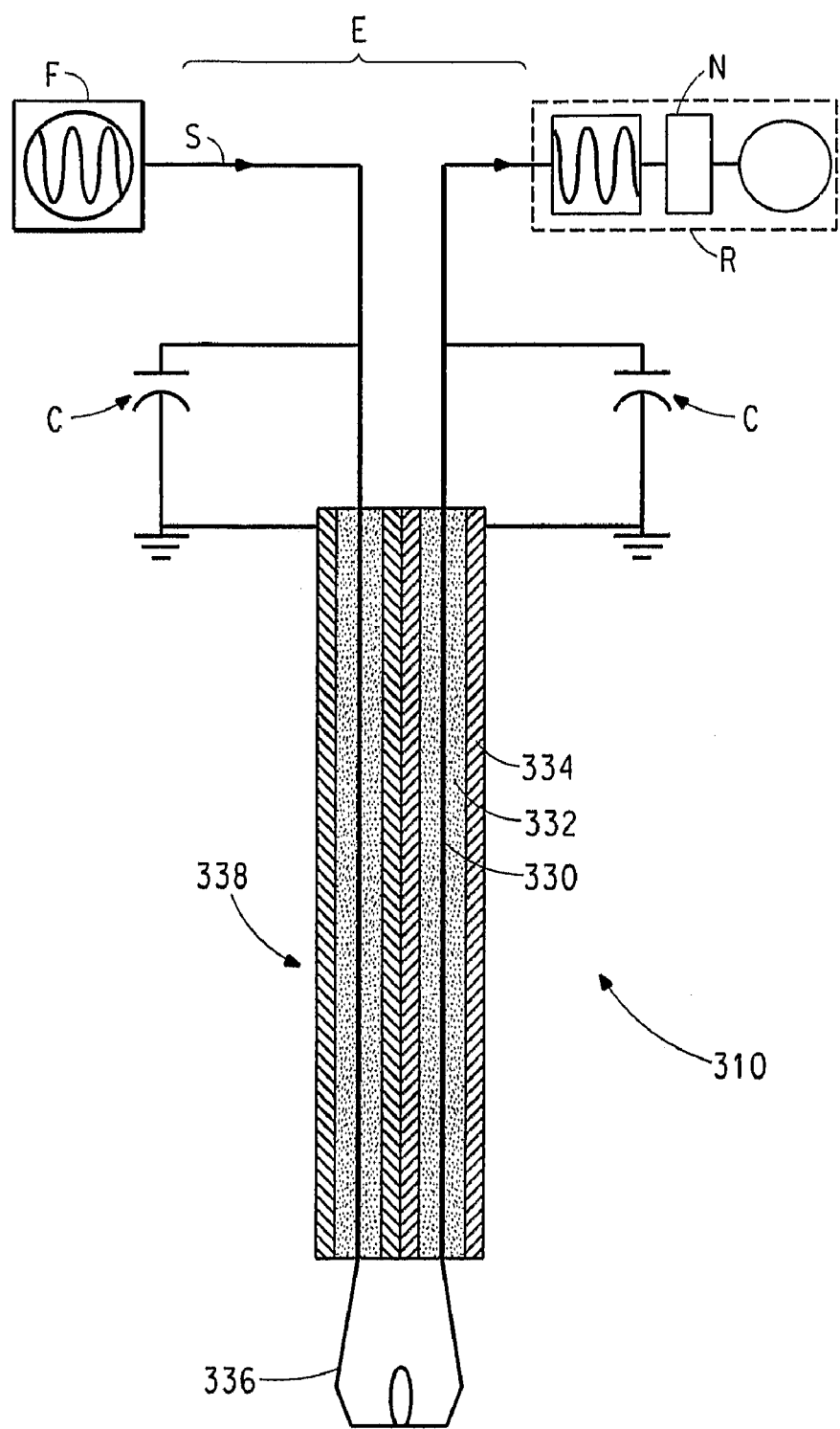

The method in accordance with the second embodiment of the present invention may also be practiced using a modified sensing apparatus as illustrated in FIGS. 11A and 11B.

The sensing apparatus 210 shown in FIG. 11A is disclosed and claimed in copending application Ser. No. 60/531,034, filed Dec. 18, 2003 and assigned to the assignee of the present invention (CL-2470), while the sensing apparatus 310 shown in FIG. 11B is disclosed and claimed in copending application Ser. No. 60/531,031, filed Dec. 18, 2003 and also assigned to the assignee of the present invention (CL-2469).

In each case the sensing apparatus 210 (FIG. 11A) or 310 (FIG. 11B) comprises a length of transmission line 220/320 having an inner conductor 230/330 surrounded by a dielectric material 232/332 and at least one shielding conductor 234/334. Only a single sublength 236/336 of the inner conductor 230/330 is exposed at the distal end of the shielded sublength 238/338 of the respective transmission line 220/320.

In FIG. 11A the single exposed sublength 236 takes the form of monopole sensing element while in FIG. 11B the single exposed sublength 336 takes the form of looped sensing element.

Figure 12A:
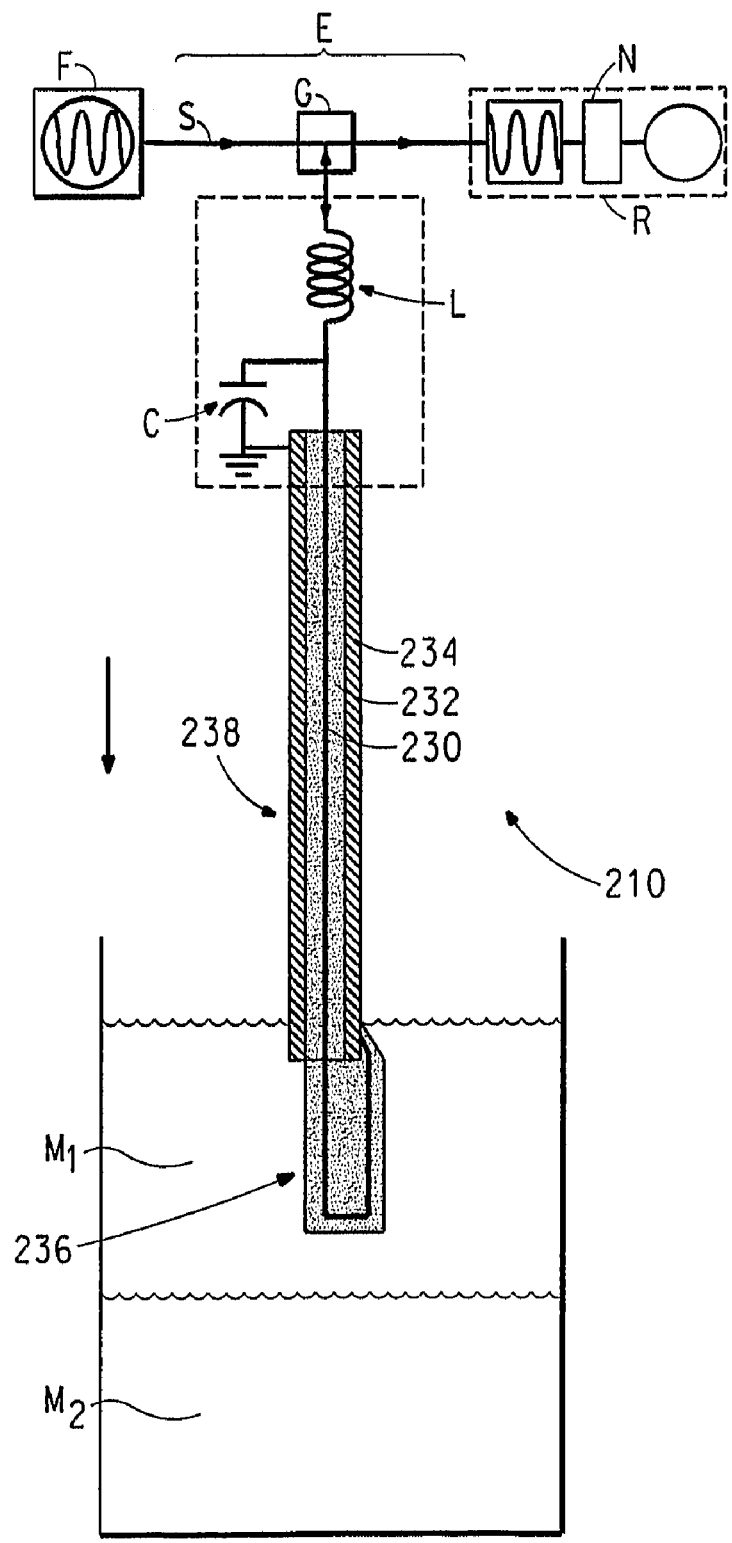
FIGS. 12A and 12B are schematic views similar to FIGS. 9A and 9B, showing a sensing apparatus of FIG. 11A in use in accordance with the second embodiment of a method of the present invention to detect an interface between first and second materials $M_1$, $M_2$ respectively, disposed in a stratified manner in a volume of materials, where the sensing apparatus is inserted progressively into the volume.
Figure 12B:
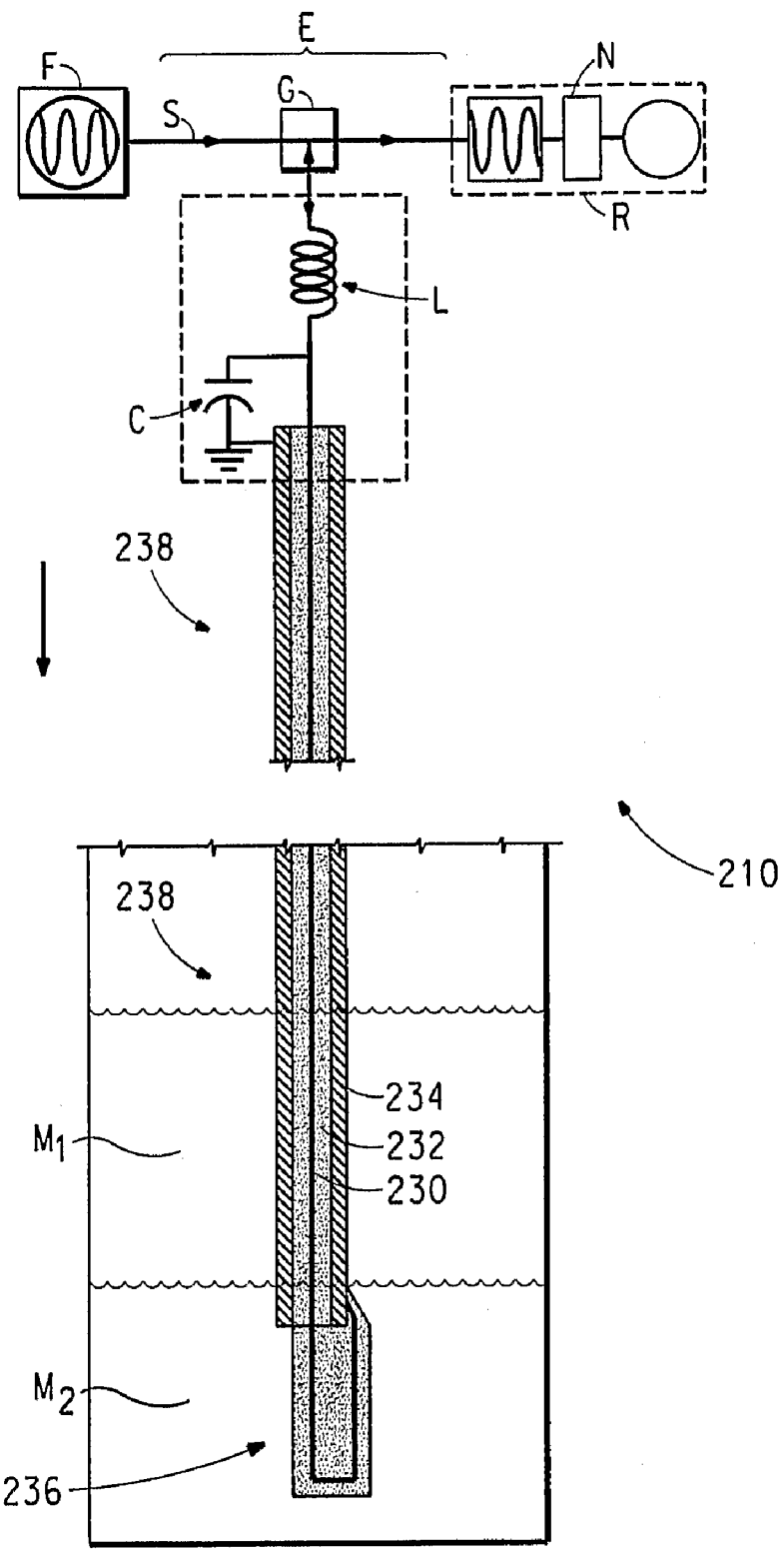

The sensing apparatus shown in FIG. 11A or 11B may be used to practice the second embodiment of the method of the present invention in a manner similar to that discussed in connection with FIGS. 9A, 9B. In FIGS. 12A, 12B only the sensing apparatus 210 of FIG. 11A is shown.

As the sensing apparatus 210/320 is progressively inserted into the material $M_1$ (FIG. 12A) a first distance range "a" is defined in which the attenuation increases at a substantial rate. This is graphically illustrated in Region I of the plot of FIG. 13. The attenuation increases until the full length of the single exposed sublength 336 is immersed in material $M_1$, at which time the attenuation reaches level $A_1$.

As long as the single sublength 336 is within material $M_1$ further insertion results in no further change in attenuation. As illustrated in Region II of FIG. 13 this serves to define a second distance range "b" in which the attenuation has substantially no change.

Figure 13:
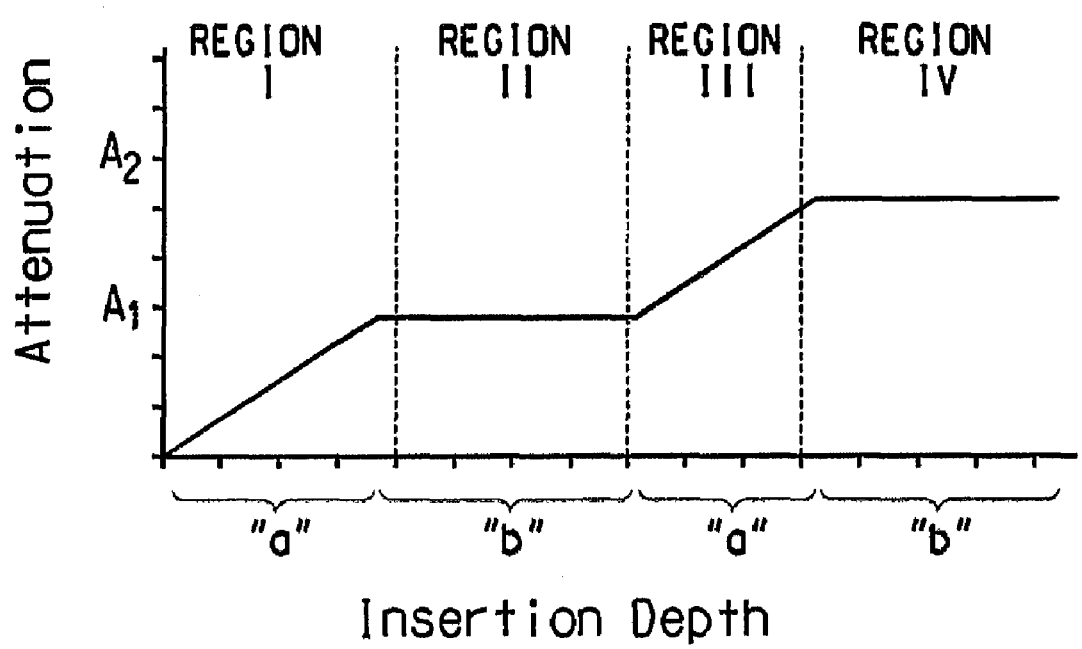
FIG. 13 is a plot showing the attenuation of a radio frequency signal passing though the sensing apparatus as a function of insertion distance.

When the single exposed sublength 236/336 passes into the material $M_2$ (FIG. 12B) the change in attenuation resumes, thus defining another distance range "a" (Region III of FIG. 13). Assuming the loss factor $L_2$ in the material $M_2$ is greater than the loss factor $L_1$ in the material $M_1$, attenuation increases to reach the level $A_2$ when the exposed sublength 236/336 is fully immersed in material $M_2$.

From that point on further insertion of the exposed sublength 236/336 produces no further increase in attenuation (i.e., another distance range "b").

The attenuation is monitored as a function of insertion distance to detect first and second distance ranges "a" and "b". An interface between materials is denoted by a transition from a second distance range "b" to a first distance "a".

-o-O-o-

In order to practice any of the methods of the present invention it is necessary that an electronics module E (shown in FIGS. 7, 9A, 9B, 12A and 12B) be associated with the appropriate sensing apparatus for the method under discussion. The combination of the sensing apparatus and the electronics module E defines a useful system for detecting an interface defined between a first material and a second material disposed in a stratified manner in a volume of materials.

The electronics module E includes a source F of a radio frequency signal S and a receiver R. A directional coupler G couples the source F to the sensing apparatus and the sensing apparatus to the receiver R. A detection network N is associated with the receiver R for determining the attenuation of the signal arriving at the receiver R.

One or more optional capacitor(s) C and/or inductor(s) L aid(s) in increasing the sensitivity of the sensing apparatus by matching the impedance of the source F to the transmission line of the sensing apparatus. The transmission line may extend so that it spaces the electronics module E from any hostile environment in which the sensing apparatus might be placed, while transmitting the radio frequency signal S faithfully between the sensing apparatus and the electronics module E.

Those skilled in the art, having the benefit of the teachings hereinabove set forth, may impart numerous modifications thereto. Such modifications are to be construed as lying within the scope of the present invention, as defined by the appended claims.

What is claimed is:

1. A method of detecting an interface between first and second materials having different dielectric loss factors disposed in a stratified manner in a volume of materials using a sensing apparatus having a length of coaxial transmission line including an inner conductor surrounded by a dielectric material and a shielding conductor, a predetermined number of sublengths of the inner conductor being exposed along the length of the transmission line, adjacent sublengths of the exposed inner conductor being separated by shielded sublengths, the method comprising the steps of:
  exciting the sensing apparatus by a radio frequency signal at a predetermined amplitude,
  inserting the excited sensing apparatus into the volume of materials to a predetermined depth through the first layer and into the second layer such that a predetermined number of exposed sublengths is disposed within the volume of materials,
  detecting the signal transmitted through the sensing apparatus and measuring the attenuation of the signal,
  identifying the interface between strata within the volume based upon the attenuation of the radio frequency signal, wherein the attenuation of the radio frequency signal is proportional to the total number of sublengths of the inner conductor exposed to each of the materials.

2. A method of detecting an interface between first and second materials having different dielectric loss factors disposed in a stratified manner in a volume of materials using a sensing apparatus having a length of transmission line including an inner conductor surrounded by a dielectric material and at least one shielding conductor, a predetermined number of sublengths of the inner conductor being exposed along the length of the transmission line, adjacent sublengths of the exposed inner conductor being separated by shielded sublengths, the method comprising the steps of:
  exciting the sensing apparatus by a radio frequency signal at a predetermined amplitude,
  inserting the excited sensing apparatus into the volume of materials,
  tracking the insertion distance of the sensing apparatus within the volume,
  monitoring the attenuation of the radio frequency signal as a function of the insertion distance into the volume to detect first distance ranges having a substantial rate of change of attenuation and second distance ranges having substantially no change of attenuation; and
  comparing the rates of change in adjacent first distance ranges to identify differences in the rate of change of attenuation in adjacent the first distance ranges, thereby detecting an interface in the strata.

* * * * *